United States Patent
Ko

(10) Patent No.: US 6,816,366 B2
(45) Date of Patent: Nov. 9, 2004

(54) NOTEBOOK COMPUTER

(75) Inventor: Min-Hsiung Ko, Taipei (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 45 days.

(21) Appl. No.: 10/318,174

(22) Filed: Dec. 13, 2002

(65) Prior Publication Data

US 2004/0061998 A1 Apr. 1, 2004

(30) Foreign Application Priority Data

Sep. 27, 2002 (TW) .......................... 91122421 A

(51) Int. Cl.[7] .............................................. H05K 5/00
(52) U.S. Cl. ..................... 361/683; 361/681; 345/168
(58) Field of Search ................... 361/680, 681, 361/683, 684, 686, 679, 724–727; 364/708.1; 345/168, 169

(56) References Cited

U.S. PATENT DOCUMENTS

| | | | | |
|---|---|---|---|---|
| 4,978,949 A | * | 12/1990 | Herron et al. ............... | 345/168 |
| 5,793,606 A | * | 8/1998 | Cubbage et al. ............ | 361/681 |
| 5,805,415 A | * | 9/1998 | Tran et al. ................... | 361/681 |
| 6,006,243 A | * | 12/1999 | Karidis ....................... | 708/100 |
| 6,310,768 B1 | * | 10/2001 | Kung et al. .................. | 361/681 |
| 6,317,315 B1 | * | 11/2001 | Lee et al. .................... | 361/681 |
| 6,480,373 B1 | * | 11/2002 | Landry et al. .............. | 361/680 |
| 6,512,670 B1 | * | 1/2003 | Boehme et al. ............. | 361/681 |

* cited by examiner

Primary Examiner—Dean A. Reichard
Assistant Examiner—Carmelo Oliva
(74) Attorney, Agent, or Firm—Rabin & Berdo, P.C.

(57) ABSTRACT

A notebook computer includes a main portion, a detachable display portion, a display base, and a main portion cover. The main portion includes a detachable operating panel. The display portion is rotatably attached to the main portion in order that the display portion can be opened and closed relative to the main portion. The display base is combined with the display portion to be a desktop monitor as the display portion is detached from the main portion, which can be further connected to another computer main portion. The main portion cover is combined with the main portion to be a desktop computer main portion, which can be further connected to another monitor, as the display portion and the operating panel are detached from the main portion. Therefore, the user will have more options and be able to use the main portion and the display portion with high brightness and high efficiency more effectively.

19 Claims, 8 Drawing Sheets

NOTEBOOK COMPUTER

This application incorporates by reference Taiwan application Serial No. 091122421, filed Sep. 27, 2002.

BACKGROUND OF THE INVENTION

1. Field of the Invention

The invention relates in general to a notebook computer, and more particularly to a notebook computer with a detachable display portion.

2. Description of the Related Art

As technology develops and changes with each passing day, computers have become indispensable tools in people's lives. Especially, a notebook computer, characteristic of being thin, small, and portable, caters for people's need nowadays.

A notebook computer mainly includes a main portion and a display portion. The display portion is rotatably attached to the main portion in order that the display portion can be opened and closed relative to the main portion by users. The main portion includes a central processor, a motherboard, a memory, a CD-ROM drive, and hard discs. Moreover, the main portion includes an operating panel having a keyboard and a touch pad for users to operate the computer while the display portion includes a display panel, such as a liquid crystal display (LCD) panel for displaying the images.

The display portion of the notebook computer nowadays tends to have a panel with high brightness and high efficiency of the same class with a desktop monitor. However, when the notebook computer needs to be upgraded, such as upgraded to a notebook computer havingupgrading an LCD screen of the notebook computer, a new notebook computer usually has to be purchased. As a result, the originalold one will be discarded, which is very pitiful and wasted. It is also unsatisfying in terms of economic benefits and environmental protection since the display portion and the main portion of the conventional notebook computer cannot be detached from each other for further use.

SUMMARY OF THE INVENTION

It is therefore an object of the invention to provide an improved notebook computer with a detachable display portion. The display portion with high brightness and high efficiency can be detached from the main portion for further use, thereby reducing the user's burden on purchasing a new notebook computer. The main portion detached from the display portion can also be an independent computer main portion for effective use.

The invention achieves the above-identified objects by providing a notebook computer with a detachable display portion. The notebook computer includes a main portion, a display portion, a display base, and a main portion cover. The main portion includes a main portion casing, an operating panel, and a motherboard. The main portion casing further includes a pivot for engaging with the operating panel, and the motherboard is disposed in the main portion casing for being coupled with the operating panel. Moreover, the display portion, rotatably attached to the main portion, includes a display casing and a display panel. The display casing includes a shaft for engaging with the pivot in order that the display casing can be rotatably attached on the main portion casing.

The display panel, disposed on the display casing, is coupled with the motherboard as the display casing engages with the main portion casing. The display base is combined with the display portion to be a desktop monitor as the display portion is detached from the main portion. The display base further includes a base casing having an opening, a bottom board, a supporting part, and a circuit board. The bottom board is disposed under the base casing and engages with the base casing. Furthermore, the supporting part is disposed on the bottom board and received in the base casing for engaging with the shaft and supporting the display portion. The circuit board, disposed on the bottom board and in the base casing, is coupled with the display panel. The main portion cover engages with the main portion casing to be a desktop computer main portion as the display casing and the operating panel are detached from the main portion casing.

The invention achieves the above-identified objects by providing another notebook computer with a detachable display portion. The notebook computer includes a main portion, a display portion, a display base, and a main portion cover. The main portion includes a main portion casing having a first pivot and a second pivot, an operating panel, and a motherboard. The operating panel, having a keyboard and a touch pad, is disposed on the main portion casing and engages with the main portion casing. Moreover, the motherboard is disposed in the main portion casing for being coupled with the operating panel. The display portion, rotatably attached to the main portion, includes a display casing and a display panel. The display casing includes a first shaft and a second shaft for respectively engaging with the first pivot and the second pivot in order that the main portion casing can be rotatably attached to the main portion casing.

The display panel is disposed on the display casing for being coupled with the motherboard as the display casing engages with the main portion casing. The display base is combined with the display portion to be a desktop monitor as the display portion is detached from the main portion. The display base includes a base casing having an opening, a bottom board, a first supporting part, and a second supporting part, a back cover, and a circuit board. The bottom board is disposed under the base casing and engages with the base casing. The first supporting part and the second supporting part are disposed on the bottom board and received in the base casing for respectively engaging with the first shaft and the second shaft and supporting the display portion. In addition, the back cover is used to cover the opening as the display portion is combined with the display base. The circuit board, disposed on the bottom board and received in the base casing, includes a power receiver, a connector for coupling the circuit board with the display panel, a signal receiver, and a logic processing unit. The signal receiver is used for receiving an analog signal and a digital signal. The analog signal is transformed to a digital signal by the logic processing unit where the digital signal received by the logic processing unit is output directly to the connector. The digital signal output by the logic processing unit is further transmitted to the display panel by the connector. Moreover, the main portion cover engages with the main portion casing to be a desktop computer main portion as the display casing and the operating panel are detached from the main portion casing.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides a notebook computer with a detachable display portion in order that the main portion and the display portion can be used independently by connecting with another monitor and another main portion, which provides more options and convenience.

Figure 1:
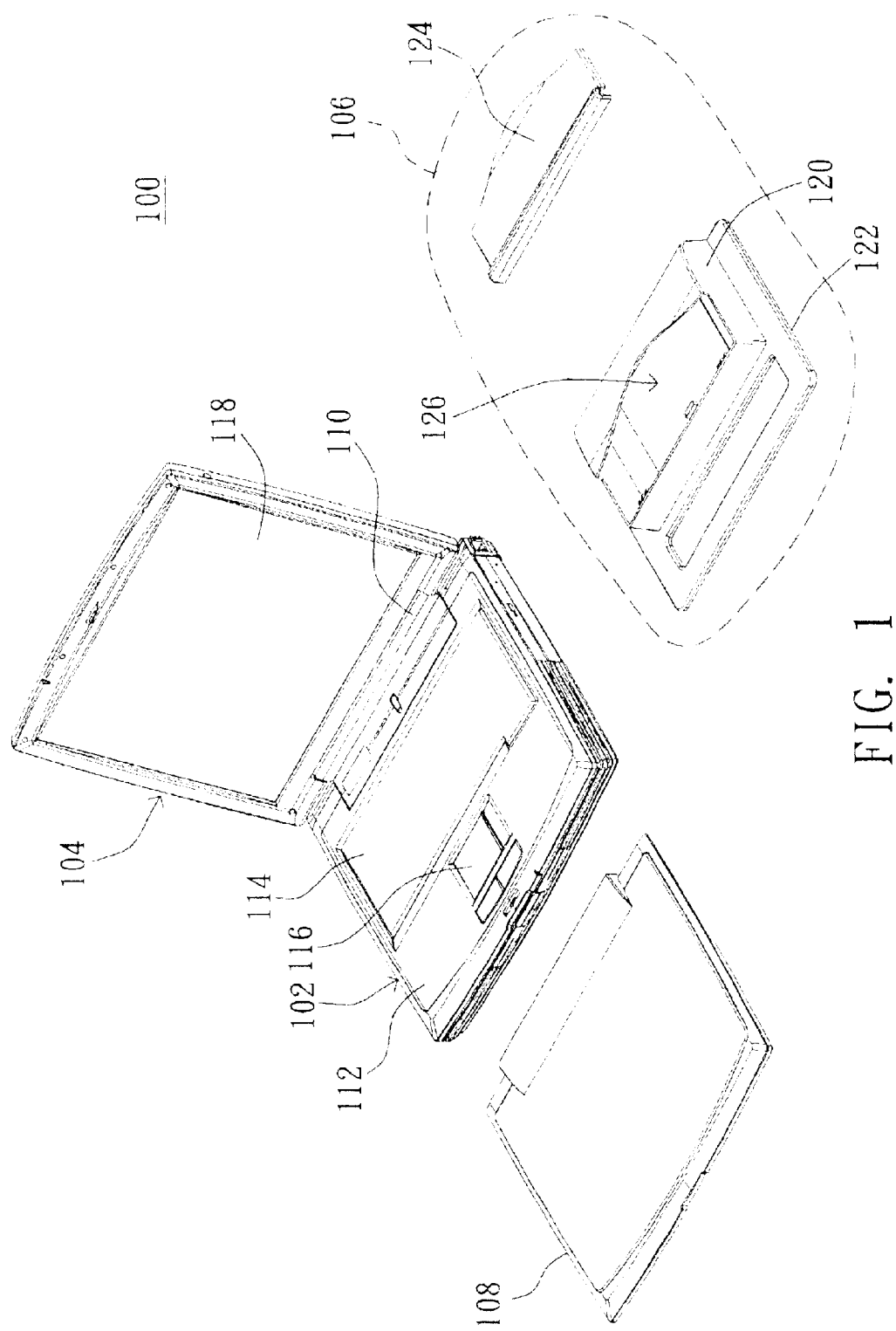
FIG. 1 is a schematic view of the notebook computer according to a preferred embodiment of the invention.

Referring to FIG. 1, a schematic view of a notebook computer according to a preferred embodiment of the invention is shown. In FIG. 1, the notebook computer includes a main portion 102, a display portion 104, a main portion cover 108, and a display base 106 (as shown within the region of the dotted line of FIG. 1). The main portion 102 has a detachable operating panel 112, and the operating panel 112 has a keyboard 114 and a touch pad 116 for the users to input data. The display portion 104 is rotatably attached to the main portion 102 and engages with the main portion 102 in order that the display portion 104 can be opened and closed relative to the main portion 102. The display portion 104 includes a display panel 118, such as a high-brightness and high-efficiency liquid crystal display (LCD) panel.

The display base 106 can be combined with the display portion 104 to be an independent desktop monitor, which can be further connected to another main portion, such as a desktop computer, when the display portion 104 is detached from the main portion 102. The display base 106 includes a base casing 120, a bottom board 122, and a back cover 124. The base casing 120 has an opening 126 and the bottom board 122 is disposed under the base casing 120 and engagesby engaging with the base casing 120. The main portion cover 108 covers the main portion 102 to be an independent desktop main portion, which can be further connected to another monitor, when the display portion 104 and the operating panel 112 are detached from the main portion 102. Moreover, the notebook computer 100 further includes a shaft cover 110 for covering the linking part between the main portion 102 and the display portion 104 andby engaging with the linking part.

Figure 2:
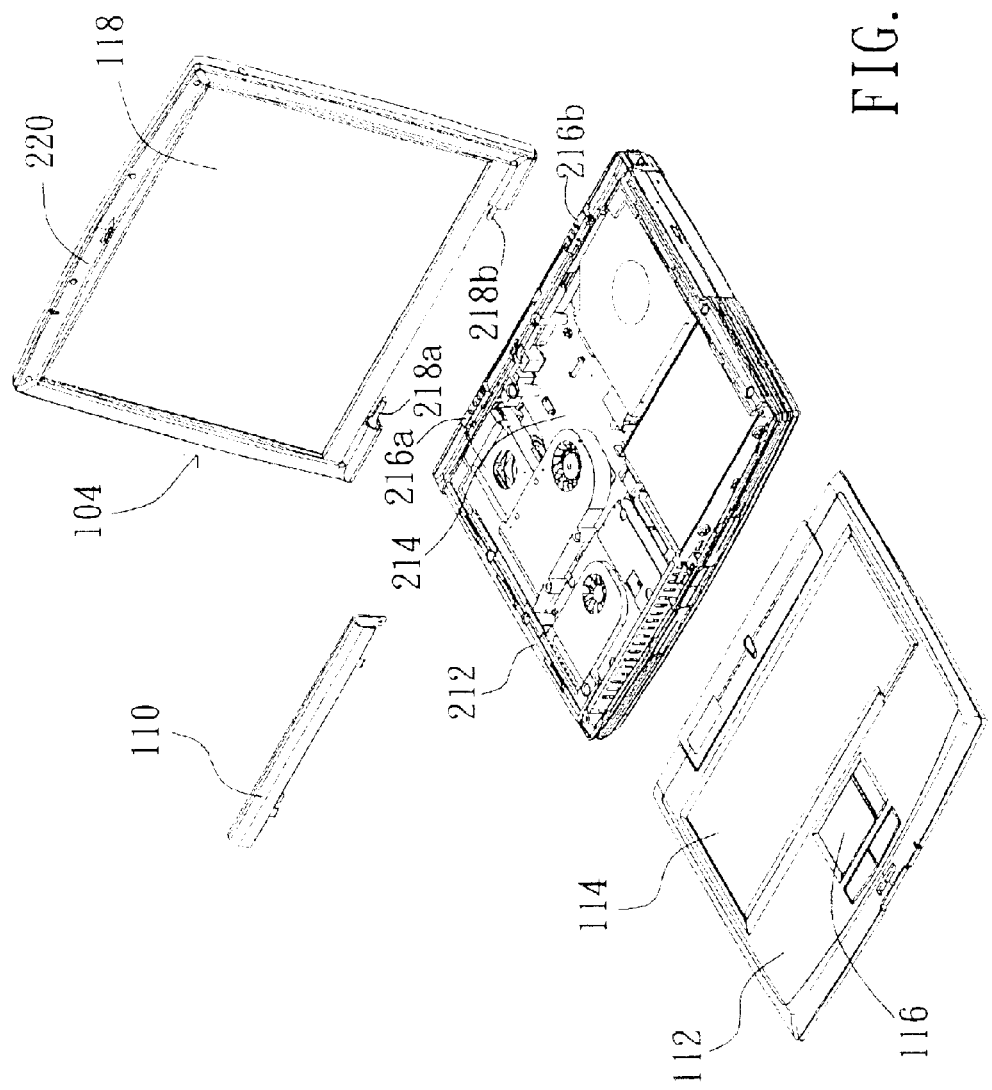
FIG. 2 is a schematic view of the notebook computer with the display portion, the operating panel, and the shaft cover detached from the main portion in FIG. 1.

Referring to FIG. 2, a schematic view of the notebook computer with the display portion, the operating panel, and the shaft cover detached from the main portion in FIG. 1 is shown. In FIG. 2, the main portion 102 at least includes a main portion casing 212, and a motherboard 214. The main portion casing 212 includes a pivot, such as a first pivot 216a and a second pivot 216b. The operating panel 112 or the main portion cover 108 in FIG. 1 is selectively disposed on the main portion casing 212 by slidably engaging with the main portion casing 212. The motherboard 214 is disposed in the main portion casing 212 for being coupled with the operating panel 112. In addition, the main portion 102 of FIG. 1 further includes a central processor, a memory, a CD-ROM drive, hard discs, and a spare battery, and all of them are disposed in the main portion casing 212 and coupled with the motherboard 214.

The display portion 104 further includes a display casing 220 having shafts, such as a first shaft 218a and a second shaft 218b for respectively engaging with the first pivot 216a and the second pivot 216b in order that the display portion 104 can be opened and closed relative to the main portion 102. The display panel 118 is disposed on the display casing 220 and the display panel 118 is coupled with the motherboard 214 as the display casing 220 engages with the main portion casing 212.

Figure 3:
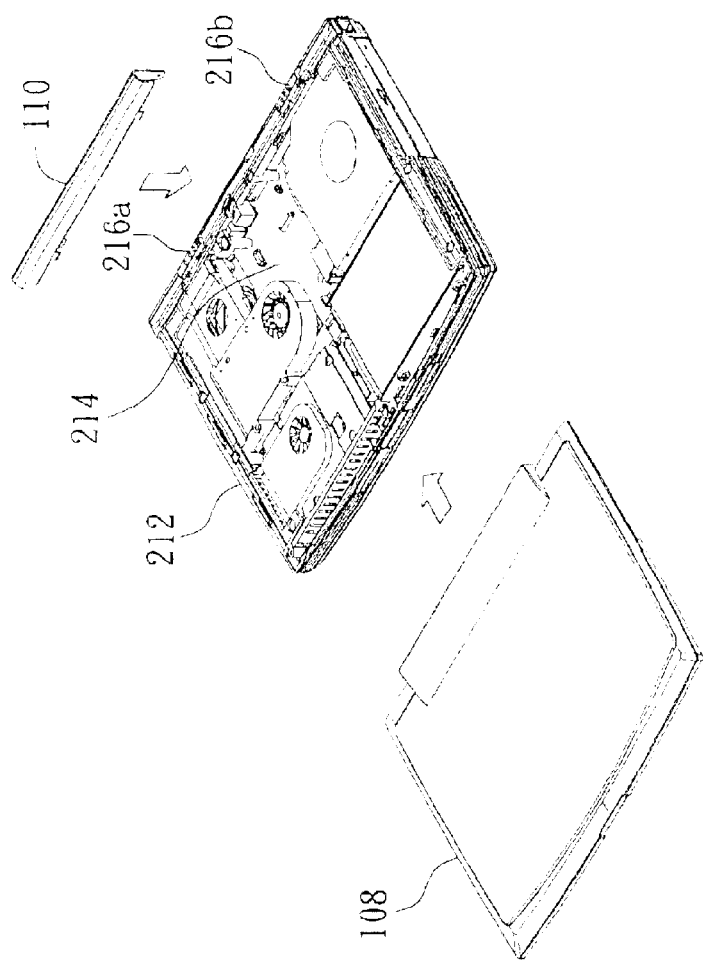
FIG. 3 is a schematic view of the main portion detached from the operating panel, the shaft cover, and the main portion cover in FIG. 1.
Figure 4:
FIG. 4 is a schematic view of the desktop computer main portion combined by the main portion detached from the operating panel, the shaft cover, and the main portion cover in FIG. 1.
Figure 5:
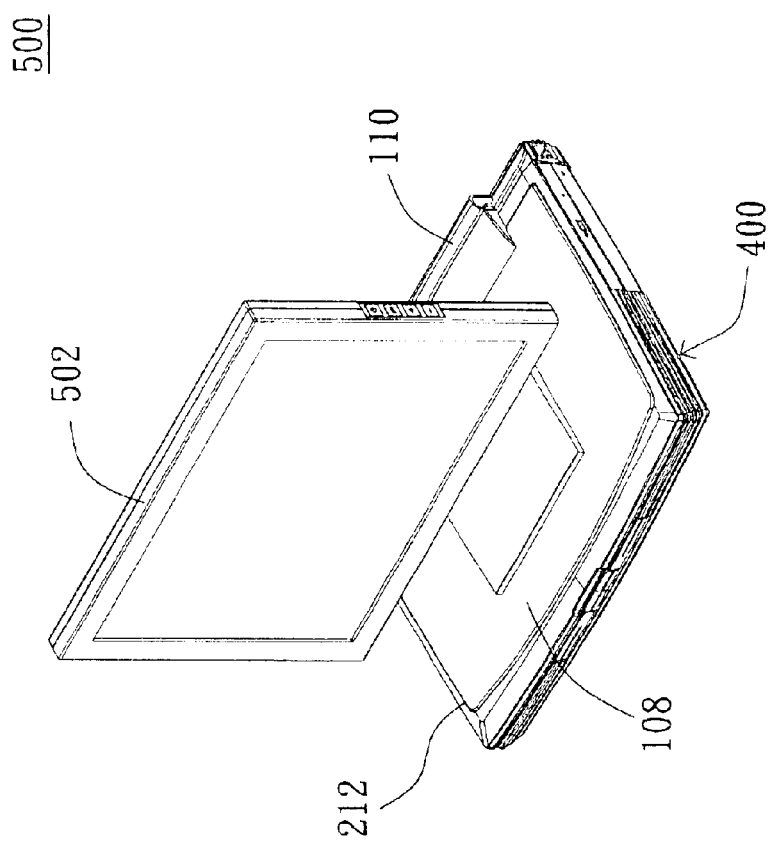
FIG. 5 is a schematic view of the desktop computer, which combines the desktop computer main portion in FIG. 4 and a desktop monitor.

When the main portion casing 212, the main portion cover 108, and the shaft cover 110 are to be combined by users, as shown in FIG. 3, the main portion cover 108 firstly engages with the main portion casing 212, in which the motherboard 214 and other devices are disposed. Subsequently, the first pivot 216a and the second pivot 216b are covered by the shaft cover 110. Therefore, the main portion 102 is detached independently from the display portion 104. An operating panel including a keyboard or a touch pad can be combined with the main portion cover 108 and the shaft cover 110 as a desktop computer main portion 400, as shown in FIG. 4. The desktop computer main portion 400 can also be connected with a keyboard or a mouse. In addition, the desktop computer main portion 400 can be connected with a desktop monitor 502 to be a desktop computer 500 as shown in FIG. 5.

In particular, since the main portion cover 108 can be used to protect the devices disposed in the main portion casing 212 from the electricmagnetic interference and loaded with high gravity, the desktop monitor 502 can be put on the desktop computer main portion 400 directly to reduce the occupied space of the computer hardware.

Figure 6:
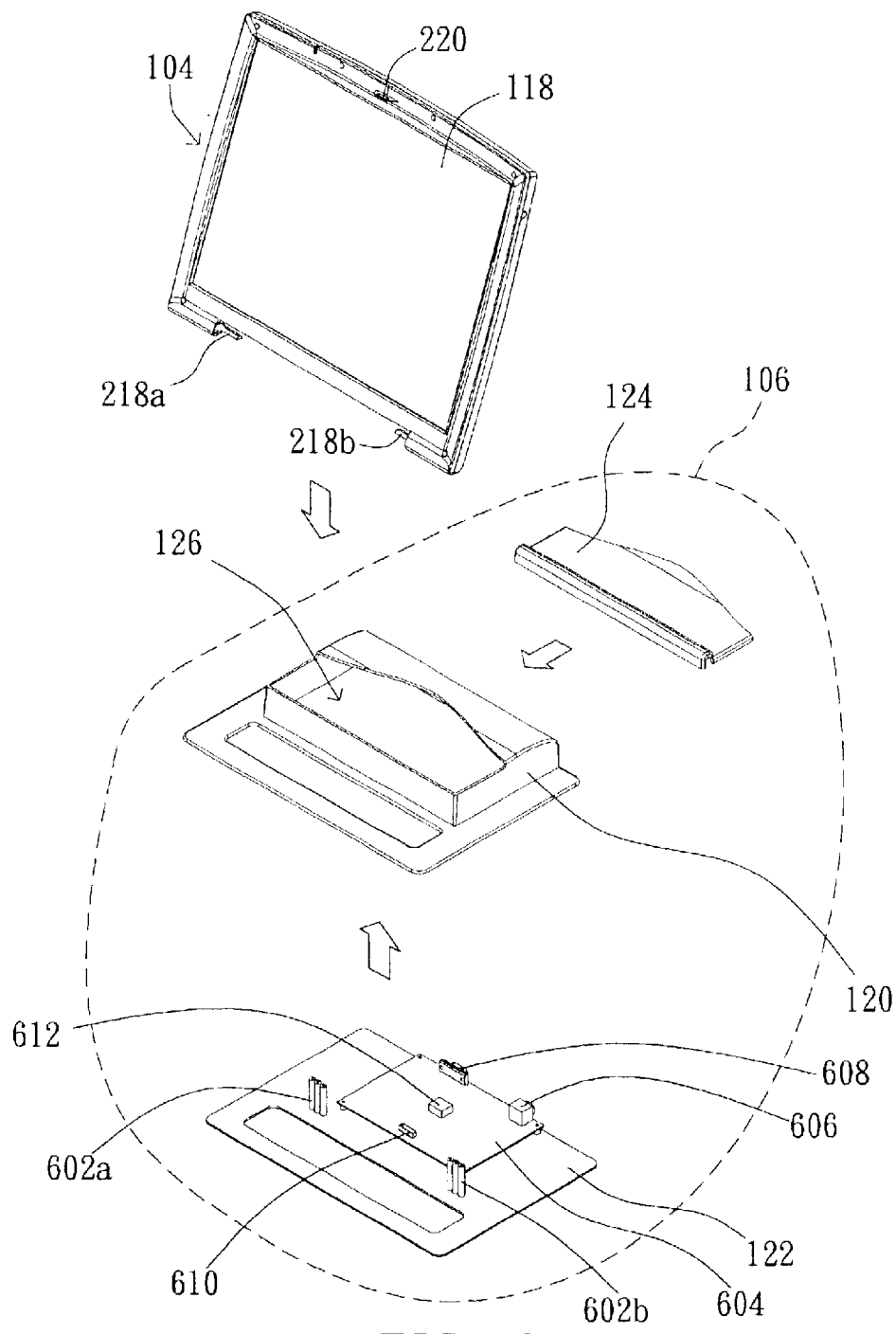
FIG. 6 is an exploded view of the display portion and the display base in FIG. 1.

Referring to FIG. 6, an exploded view of the display portion and the display base in FIG. 1 is shown. In FIG. 6, the display base 106 includes a circuit board 604 and supporting parts, such as a first supporting part 602a and a second supporting part 602b. The first supporting part 602a and the second supporting part 602b are disposed on the bottom board 122 for engaging with the first shaft 218a and the second shaft 218b and supporting the display portion 104. The circuit board 604, disposed on the bottom board 122, is coupled with the display panel 118 and received in the base casing 120 as the base casing 120 is connected to the bottom board 122.

As described above, the circuit board 604 further includes a power-receiver 606, a connector 610, a signal receiver 608, and a logic processing unit 612. The connector 610 is used for coupling the circuit board 604 with the display panel 118. The logic processing unit 612, coupled with the signal receiver 608 and the connector 610, transforms the analog signal to the digital signal.

Figure 7:
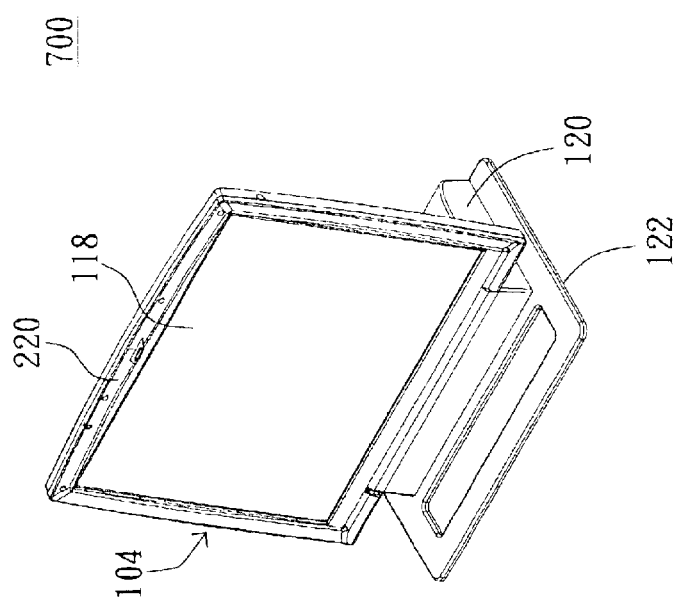
FIG. 7 is a schematic view of the desktop monitor, which combines the display portion and the display base in FIG. 1.

When the display portion 104 is combined with the display base 106 to be a desktop monitor as shown in FIG. 6, the base casing 120 is firstly connected to the bottom board 122 to in order that the first supporting part 602a, the second supporting part 602b, and the circuit board 604 are received in the base casing 120. The power receiver 606 and the signal receiver 608 are exposed at one side of the base casing 120 for respectively receiving electric power and signals. Subsequently, the first supporting part 602a and the second supporting part 602b respectively engage with the first shaft 218a and the second shaft 218b for supporting the display portion 104. The back cover 124 covers partially the opening 126 to prevent the dust or other materials from entering the display base 106 and keeping the good operation of the circuit board 604. As a result, the display portion 104, detached from the main portion 102 in FIG. 1, is combined with the display base 106 to be a desktop monitor 700 as shown in FIG. 7.

Figure 8:
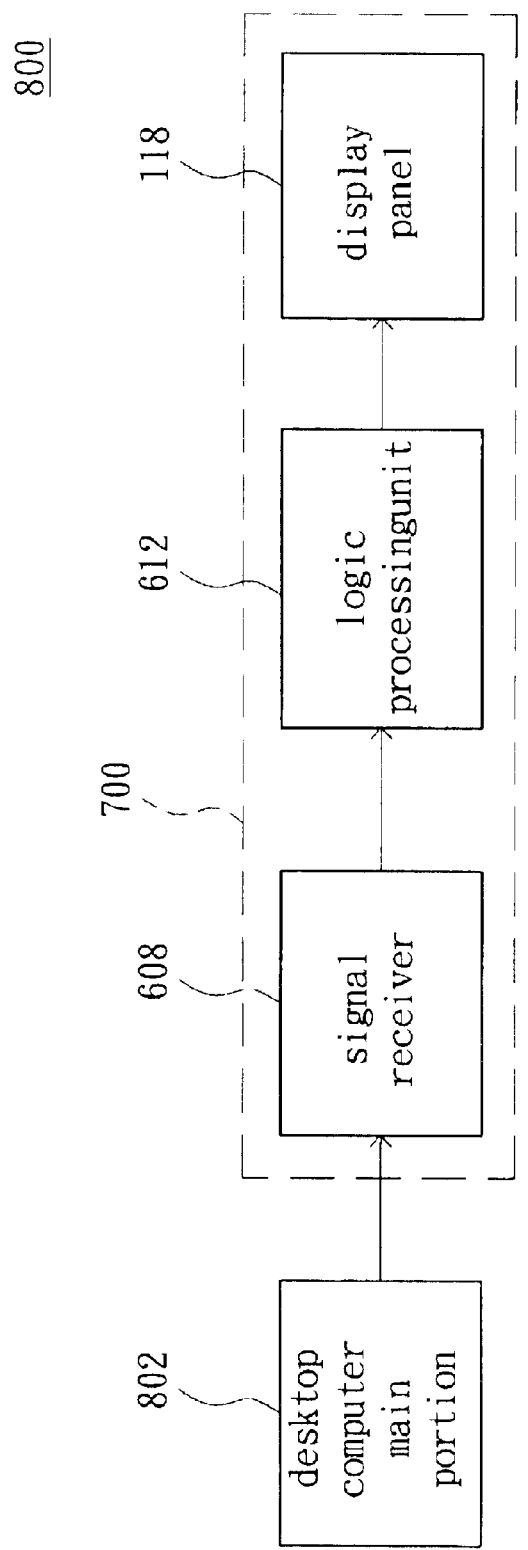
FIG. 8 is a block diagram of the desktop computer, which combines the desktop monitor in FIG. 7 and a desktop computer main portion.

Besides, the desktop monitor 700 can be connected to a desktop computer main portion 802 to be a desktop computer 800 as shown in FIG. 8. In FIG. 8, the signal receiver 608 is coupled with desktop computer main portion 802 for receiving the analog signal and the first digital signal output by the desktop computer main portion 802. Subsequently, the logic processing unit 612 transforms the analog signal to a second digital signal and outputs the second digital signal to the display panel 118; otherwise the logic processing unit 612 outputs the first digital signal directly to the display panel 118. Lastly, the display panel 118 displays the corresponding images.

However, any person skilled in the art will recognize that the technique of the invention is not limited as mentioned above. For example, the bottom board can be a metal board, such as an iron board, and the first supporting part and the second supporting part can be two metal bars, such as copper bars. Moreover, the display panel can be coupled with the motherboard or the circuit board by a signal line, which is connected to the connector 610 by insertion.

Therefore, according to the invention of the notebook computer with a detachable display portion, the main portion can be an independent computer main portion and further connected with any other monitor in the market so that the main portion not only has the same operation effects as the typical desktop computer main portion but also occupies less space than the typical desktop computer. The display portion is designed to have a panel with high brightness and high efficiency of the same class with the typical desktop monitor. The display portion can be connected to the exclusive display base to form an independent monitor, thereby elongating the display portion lifespan and further being combined with the faster computer main portion.

The notebook computer in the invention has advantages as follows:

1. The main portion detached from the display portion and the operating panel can be combined with the main portion cover to be a new computer main portion, which can be further connected to other monitor so that the detached display portion and main portion can be used more effectively.

2. The display portion detached from the main portion can be combined with the display base to be a monitor for users to connect other computer main portion. Therefore, the display portion with high brightness and high efficiency can still possess its value even though it is detached from the main portion, thereby reducing the extra financial burden of the users.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A notebook computer, comprising:
    a main portion having a main portion casing with a pivot;
    a detachable display portion, rotatably attached to the main portion and being adapted to be opened and closed relative to the main portion, the detachable display portion being detachable from the main portion;
    a display base, being combinable with the detachable display portion to form an independent desktop monitor that is couplable to a further main portion when the detachable display portion is fully detached from the main portion;
    a detachable operating panel, disposed on the main portion casing and slidably engaging with the main portion casing;
    a motherboard disposed in the main portion casing for being coupled with the operating panel; and
    a fully removable main portion cover, combinable with the main portion to form a desktop computer main portion when the detachable operating panel is detached from the main portion.

2. The notebook computer according to claim 1, wherein the main portion cover is disposable on the main portion casing.

3. The notebook computer according to claim 1, wherein the main portion further comprises a central processor, a memory, a CD-ROM drive, and a hard disc, all of which are disposed in the main portion casing and are coupled with the motherboard.

4. The notebook computer according to claim 1, wherein the detachable display portion further comprises:
    a display casing having a shaft for engaging with the pivot in order that the display casing can be rotatably attached to the main portion casing; and
    a display panel disposed on the display casing for being coupled with the motherboard when the display casing is rotatably attached to the main portion casing.

5. The notebook computer according to claim 4, further comprising a shaft cover for covering the shaft when the shaft engages with the pivot and covering the pivot when the main portion cover is engaged with the main portion casing.

6. The notebook computer according to claim 4, wherein the display panel is a liquid crystal display (LCD) panel.

7. The notebook computer according to claim 4, wherein the display base further comprises:
    a base casing with an opening;
    a bottom board, disposed under the base casing and engaging with the base casing;
    a supporting part, disposed on the bottom board and received in the base casing for engaging with the shaft and supporting the detachable display portion; and
    a circuit board, disposed on the bottom board and in the base casing for being coupled with the display panel.

8. The notebook computer according to claim 7, wherein the bottom board is a metal board.

9. The notebook computer according to claim 7, wherein the supporting part is a metal bar.

10. The notebook computer according to claim 7, wherein the display base further comprises a back cover for covering the opening when the detachable display portion is connected to the display base.

11. The notebook computer according to claim 7, wherein the circuit board further comprises:

a power receiver;

a connector for coupling the circuit board to the display panel;

a signal receiver for receiving an analog signal and a first digital signal;

a logic processing unit, being coupled with the connector and signal receiver, for receiving the analog signal and the first digital signal, wherein the logic processing unit is adapted to transform the analog signal to a second digital signal and outputs the second digital signal or the first digital signal to the display panel.

12. The notebook computer according to claim 11, wherein the display panel is coupled with the motherboard or the connector by a signal line.

13. The notebook computer according to claim 1, wherein the operating panel comprises a keyboard or a touch pad.

14. A notebook computer, comprising:

a main portion;

a detachable display portion, rotatably attached to the main portion and being adapted to opened and closed relative to the main portion;

a display base, being combinable with the detachable display portion to form an independent desktop monitor that is couplable to a further main portion when the detachable display portion is fully detached from the main portion;

a detachable operating panel, disposable on the main portion and slidably engaging with the main portion; and a detachable and fully removable main portion cover;

wherein the detachable main portion cover is combinable with the main portion to form a desktop computer main portion when the detachable display portion and the detachable operating panel are detached from the main portion, and the detachable operating panel is combinable with the main portion when the main portion cover is detached from the main portion.

15. The notebook computer according to claim 14, wherein the main portion further comprises:

a main portion casing with a pivot;

a motherboard, disposed in the main portion casing for being coupled with the operating panel; and a central processor, a memory, a CD-ROM drive, and a hard disc, which are disposed in the main portion casing and are coupled with the motherboard.

16. The notebook computer according to claim 15, wherein the display portion includes a display casing having a shaft for engaging with the pivot; further comprising a shaft cover for covering the shaft and the pivot when the shaft engages with the pivot and covering the pivot when the main portion cover engages with the main portion casing.

17. The notebook computer according to claim 16, wherein the display base further comprises:

a base casing with an opening;

a bottom board, disposed under the base casing and engaging with the base casing;

a supporting part, disposed on the bottom board and received in the base casing, the supporting part engaging with the shaft and supporting the detachable display portion;

a circuit board, disposed on the bottom board and received in the base casing, the circuit board being coupled with the display portion; and a back cover for covering the opening when the detachable display portion is connected to the display base.

18. The notebook computer according to claim 17, wherein the circuit board further comprises:

a power receiver;

a connector for coupling the circuit board to the display portion;

a signal receiver for receiving an analog signal and a first digital signal; and a logic processing unit, being coupled to the connector and the signal receiver, for receiving the analog signal and the first digital signal, wherein the logic processing unit is adapted to transform the analog signal to a second digital signal and outputs the second digital signal or the first digital signal to the display portion.

19. The notebook computer according to claim 15, wherein the detachable display portion includes a liquid crystal display (LCD) panel, coupled with the motherboard when the display portion engages with the main portion.

* * * * *